United States Patent
Akamatsu (10) Patent No.: US 10,184,576 B2
(45) Date of Patent: Jan. 22, 2019

(54) PRESSURE CONTROL VALVE

(71) Applicant: AISAN KOGYO KABUSHIKI KAISHA, Obu-shi, Aichi-ken (JP)

(72) Inventor: Toshiaki Akamatsu, Kariya (JP)

(73) Assignee: AISAN KOGYO KABUSHIKI KAISHA, Obu-Shi, Aichi-Ken (JP)

( * ) Notice: Subject to any disclaimer, the term of this patent is extended or adjusted under 35 U.S.C. 154(b) by 85 days.

(21) Appl. No.: 15/364,857

(22) Filed: Nov. 30, 2016

(65) Prior Publication Data
US 2017/0152958 A1 Jun. 1, 2017

(30) Foreign Application Priority Data
Nov. 30, 2015 (JP) ................... 2015-233613

(51) Int. Cl.
*F16K 1/36* (2006.01)
*F16K 15/02* (2006.01)

(52) U.S. Cl.
CPC .............. *F16K 15/028* (2013.01); *F16K 1/36* (2013.01)

(58) Field of Classification Search
CPC .................. F16K 15/028; F16K 1/36
See application file for complete search history.

(56) References Cited

U.S. PATENT DOCUMENTS

| | | | | |
|---|---|---|---|---|
| 1,507,448 A * | 9/1924 | Aldrich | ................... | F16K 27/00 137/512 |
| 3,911,950 A * | 10/1975 | Lowe | ................... | F16K 17/0466 137/543.17 |
| 4,074,694 A * | 2/1978 | Lee | ................... | G05D 16/0658 137/505.38 |
| 4,176,681 A * | 12/1979 | Mackal | ................... | F16K 15/20 137/223 |
| 4,185,656 A * | 1/1980 | Braukmann | ............ | E03C 1/106 137/512.3 |
| 4,305,425 A * | 12/1981 | Mackal | ................. | F16K 15/063 137/541 |
| 4,979,721 A * | 12/1990 | Gilbert | ................ | F16K 27/0209 137/515.5 |
| 5,360,032 A * | 11/1994 | Schenk | ................... | F24H 9/126 137/454.5 |
| 9,328,836 B2 | 5/2016 | Schultz et al. | | |
| 2004/0074539 A1* | 4/2004 | Weis | ........................ | E03C 1/104 137/543 |
| 2007/0039652 A1* | 2/2007 | Staggs | .................. | F04B 53/102 137/540 |

(Continued)

FOREIGN PATENT DOCUMENTS

JP 2013-511008 A 3/2013

*Primary Examiner* — Marina Tietjen
*Assistant Examiner* — Frederick D Soski
(74) *Attorney, Agent, or Firm* — Conley Rose, P.C.

(57) ABSTRACT

A pressure control valve has a housing including a valve seat and defining a fluid path therein, a valve body including a support member and a valve member, and a spring biasing the valve body toward the valve seat in a valve closing direction. The valve member is an integrated molding including a seal member and a reinforcement member that reinforces the seal member. The seal member is made from a rubber-like elastic material and includes a seal portion that is configured to be seated on the valve seat. The reinforcement member is engaged with the support member without using a separate member such as adhesive.

11 Claims, 5 Drawing Sheets

(56) References Cited

U.S. PATENT DOCUMENTS

| | | | |
|---|---|---|---|
| 2008/0073605 A1* | 3/2008 | Ishigaki | F16K 1/36 251/12 |
| 2009/0101858 A1* | 4/2009 | Pechtold | F16K 1/36 251/333 |
| 2013/0126624 A1* | 5/2013 | Park | F16K 1/36 236/34.5 |
| 2015/0040998 A1* | 2/2015 | Gilstad | F04B 53/001 137/514 |
| 2016/0201809 A1* | 7/2016 | Varga | F16K 1/36 251/84 |
| 2017/0305266 A1* | 10/2017 | Kimoto | B60K 15/03519 |

* cited by examiner

PRESSURE CONTROL VALVE

CROSS-REFERENCE TO RELATED APPLICATIONS

This application claims priority to Japanese patent application serial number 2015-233613, filed Nov. 30, 2015, the contents of which are incorporated herein by reference.

STATEMENT REGARDING FEDERALLY SPONSORED RESEARCH OR DEVELOPMENT

Not applicable.

BACKGROUND

This disclosure relates to a pressure control valve.

A conventional pressure control valve includes a housing, a valve body, and a spring. The housing defines a fluid path therein and has a valve seat. When the valve body is in contact with the valve seat, the pressure control valve is closed. The spring biases the valve body toward the valve seat in a valve closing direction. The valve body has a support member and a seal member. The seal member has rubber-like elasticity and includes a seal portion capable of being seated on the valve seat. The seal member is attached to the support member with an adhesive. Furthermore, in the case of a pressure control valve as disclosed in Japanese Laid-Open Patent Publication No. 2013-511008, a seal member is integrally molded on a metal support member by overmolding.

In the case of the conventional pressure control valve, attachment of the seal member to the support member with the adhesive increases its production cost. Further, when a reinforcement member is required for reinforcing the seal member, the reinforcement member is attached to the seal member with an adhesive, so its production cost is increased.

In the case of the pressure control valve disclosed in Japanese Laid-Open Patent Publication No. 2013-511008, because the seal member is molded on the metal support member by overmolding, an adhesive is not required. In addition, a ring portion (a reinforcement portion made from a metal material) formed on the support member reinforces the seal member. In such construction, it would be difficult to reinforce the seal member with a reinforcement member separate from the support member. Therefore, there has been a need for improved pressure control valves.

BRIEF SUMMARY

In an aspect of this disclosure, a pressure control valve has a housing including a valve seat and defining a fluid path therein, a valve body including a support member and a valve member, and a spring biasing the valve body toward the valve seat in a valve closing direction. The valve member is an integrated molding including a seal member and a reinforcement member that reinforces the seal member. The seal member is made from a rubber-like elastic material and includes a seal portion that is configured to be seated on the valve seat. The reinforcement member is engaged with the support member without using a separate member such as adhesive.

According this aspect, the valve member is the integrated molding having the seal member and the reinforcement member, so the production cost is lower as compared to a case wherein the reinforcement member is attached to the seal member with an adhesive. Furthermore, the reinforcement member is engaged with the support member without using the separate member such as adhesive, so the separate member for attaching the seal member to the support member is not required, thereby also lowering the production cost. Accordingly, the production costs can be lowered while reinforcing the seal member with the reinforcement member separate from the support member.

DETAILED DESCRIPTION

The additional features and teachings disclosed above and below may be utilized separately or in conjunction with other features and teachings to provide improved pressure control valves. Representative examples of the present invention, which examples utilize certain of these additional features and teachings both separately and in conjunction with one another, will now be described in detail with reference to the attached drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Embodiments relating to this disclosure will be described below with reference to the drawings. A pressure control valve of this disclosure is used for a fuel supply system of a vehicle such as automobile. First, a summary of the fuel supply system will be described.

Figure 1:
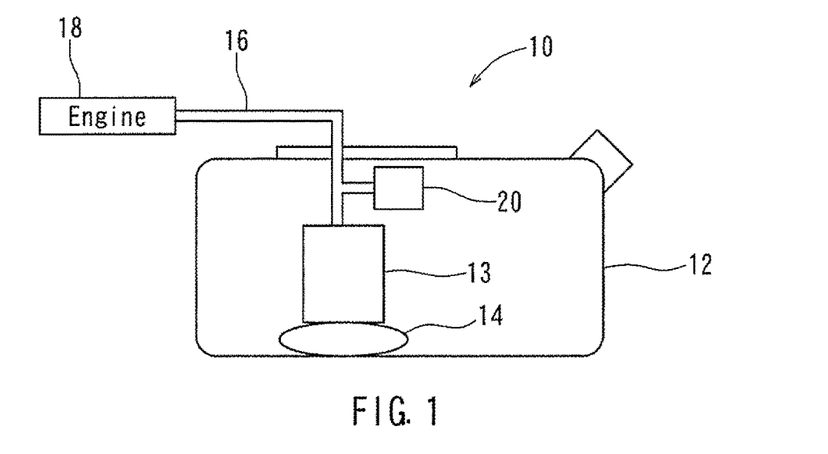
FIG. 1 is a schematic view of a fuel supply system having a pressure control valve according to a first embodiment.

A fuel supply system 10 includes a fuel tank 12 housing a fuel pump 13 therein as shown in FIG. 1. The fuel pump 13 suctions fuel stored in the fuel tank 12 through a suction filter 14 and then discharges it. A fuel supply path 16 connects the fuel pump 13 to an internal combustion engine 18 (referred to as "engine"). In the fuel tank 12, the fuel supply path 16 is provided with a pressure control valve 20.

In accordance with the fuel supply system 10, when the engine 18 is operated, the fuel pump 13 suctions the fuel stored in the fuel tank 12 thereinto and pressurizes the fuel, and then supplies the fuel through the fuel supply path 16 to the engine 18, more specifically to an intake path of the engine 18 via an injector. The pressure control valve 20 controls pressure of the fuel in the fuel supply path 16, that is, pressure of the fuel supplied to the engine 18, and discharges surplus fuel into the fuel tank 12.

Figure 2:
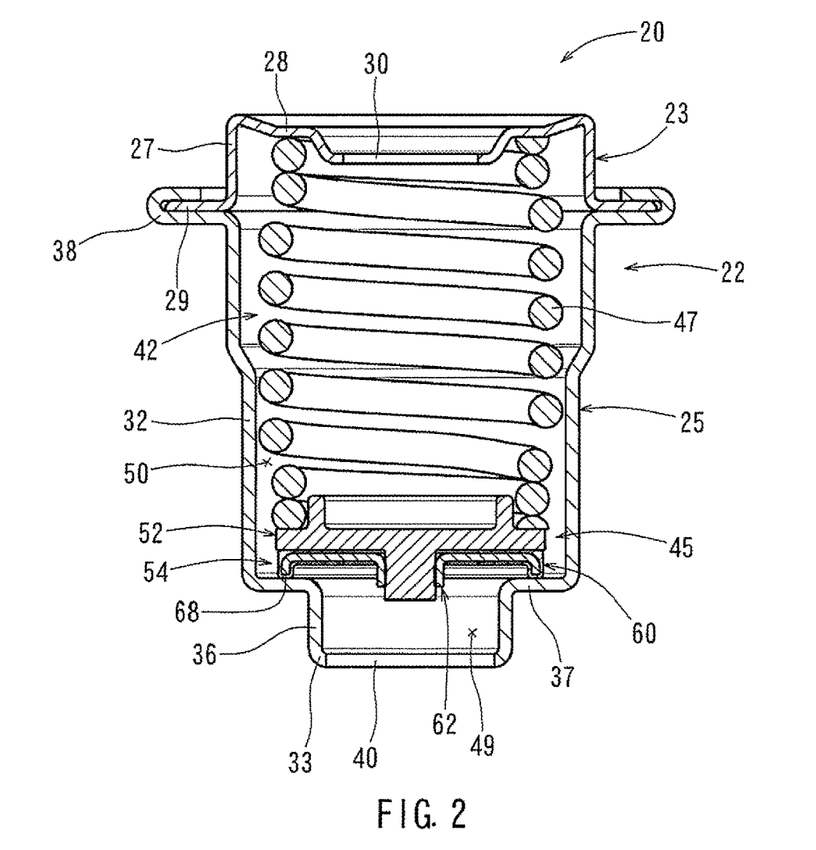
FIG. 2 is a cross-sectional view of the pressure control valve having a valve body.

The pressure control valve 20 will be described. As shown in FIG. 2, the pressure control valve 20 includes a housing 22 formed in a hollow cylindrical shape. The housing 22 is vertically divided into a first housing 23 and a second housing 25. The first housing 23 is made from a metal material such as iron and is shaped by press molding. The first housing 23 has a side wall 27 and an upper wall 28 and is formed in a hollow cylindrical shape having a lower open end and an upper closed end. The first housing 23 has a ring-shaped flange 29 radially protruding outward from a lower end of the side wall 27. The upper wall 28 has a fuel outlet 30 at a central area thereof. The fuel outlet 30 is formed in, for example, a circular shape and is coaxially arranged with the upper wall 28.

The second housing 25 is made from a metal material such as iron and is shaped by press molding. The second housing 25 has a side wall 32 and a lower wall 33 and is formed in a hollow cylindrical shape having an upper open end and a lower closed end. The side wall 32 is formed in a stepped cylindrical shape. The side wall 32 has a valve seat portion 37 at a lower part thereof. The valve seat portion 37 is formed in an annular plate shape and extends in a radial direction of the second housing 25. The second housing 25 has a flange 38 that is formed in a ring shape and radially extends outward from an upper end of the side wall 32. The lower wall 33 has a fuel inlet 40 at a central area thereof. The fuel inlet 40 is formed in, for example, a circular shape and is coaxially arranged with the lower wall 33. In this disclosure, the valve seat portion 37 corresponds to "valve seat".

Under a condition where the first housing 23 and the second housing 25 are coaxially arranged and where that the flange 29 is put on the flange 38, the flange 38 is fastened on the flange 29 by plastically folding the flange 38 back on the flange 29. In this way, the housing 22 is formed to define a fuel path 42 therein. In this disclosure, the fuel path 42 corresponds to "fluid path".

In the housing 22, a valve body 45 is disposed to be capable of moving in an axial direction of the housing 22 (a vertical direction in FIG. 2). When the valve body 45 is seated on the valve seat portion 37, the pressure control valve 20 is closed such that a fluid communication through the fuel path 42 is blocked. Conversely, when the valve body 45 is distant from the valve seat portion 37, the pressure control valve 20 is open such that the fluid communication through the fuel path 42 is allowed. A spring 47 composed of a coil spring is coaxially disposed between the upper wall 28 of the first housing 23 and the valve body 45. The spring 47 biases the valve body 45 toward the valve seat portion 37 in a valve closing direction (downward in FIG. 2). In a state that the valve body 45 is seated on the valve seat portion 37, the valve body 45 divides the fuel path 42 into a pressure regulating chamber 49 and a back pressure chamber 50. The valve body 45 will be described in more detail below.

In order to control fuel pressure, the fuel is introduced into the pressure regulating chamber 49 through the fuel inlet 40 of the second housing 25. When a pressure of the fuel in the pressure regulating chamber 49 is less than a biasing force of the spring 47, the valve body 45 is seated on the valve seat portion 37 of the housing 22 due to the biasing force of the spring 47, so that the pressure control valve 20 is closed.

Conversely, when the pressure of the fuel in the pressure regulating chamber 49 is greater than the biasing force of the spring 47, the valve body 45 is not seated on the valve seat portion 37 so that the pressure control valve 20 is open. Thus, a part of the fuel in the pressure regulating chamber 49, i.e., surplus fuel, flows into the back pressure chamber 50, and then is discharged from the back pressure chamber 50 through the fuel outlet 30. Accordingly, the pressure of the fuel in the pressure regulating chamber 49 can be decreased to a predetermined value. When the pressure of the fuel in the pressure regulating chamber 49 is decreased to the predetermined value, the valve body 45 is seated on the valve seat portion 37 due to the biasing force of the spring 47, so that the pressure control valve 20 is closed. In this way, the pressure control valve 20 controls the pressure of the fuel in the pressure regulating chamber 49 and discharges the surplus fuel.

Figure 3:
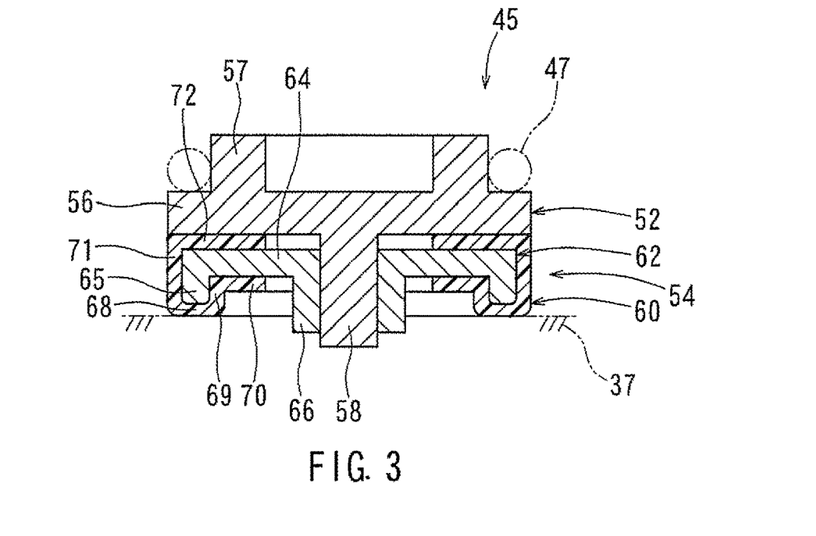
FIG. 3 is a cross-sectional view of the valve body.
Figure 4:
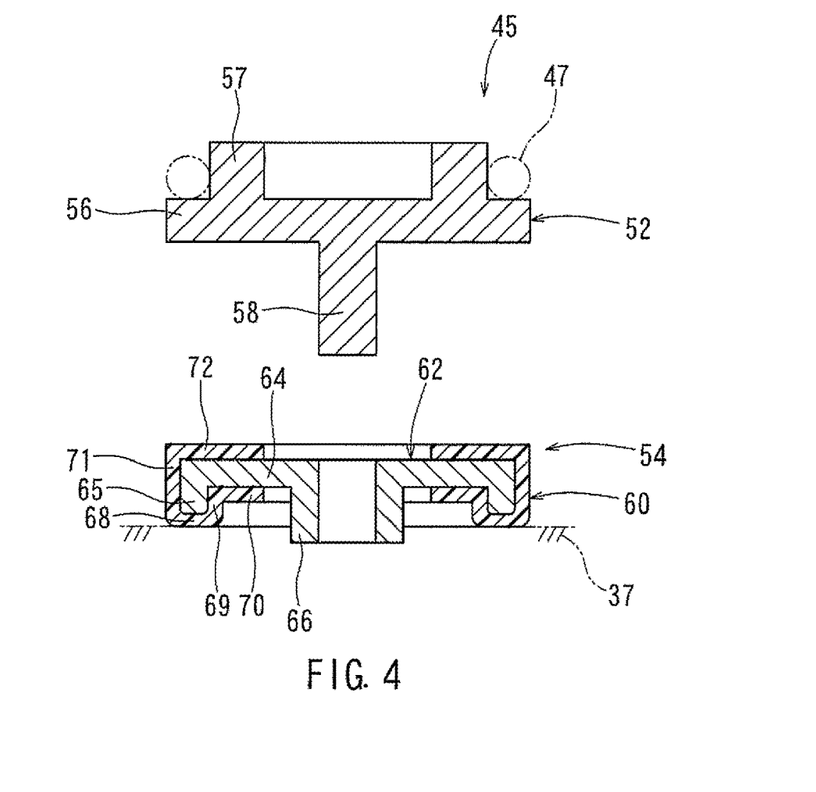
FIG. 4 is an exploded cross-sectional view of the valve body.

Next, the valve body 45 will be described in more detail. As shown in FIGS. 3 and 4, the valve body 45 includes a support member 52 and a valve member 54. The support member 52 is made from a metal material and has a main plate portion 56, a fitting portion 57 and a support axial portion 58, which are coaxially arranged. The main plate portion 56 is formed in a circular plate shape. The main plate portion 56 has an outer diameter that is substantially equal to an outer diameter of a lower end of the spring 47. The fitting portion 57 is formed in a ring shape protruding upward from an upper surface of the main plate portion 56. The fitting portion 57 has a smaller outer diameter than the main plate portion 56 such that the fitting portion 57 can be fitted into the lower end of the spring 47. The support axial portion 58 is formed in a solid cylindrical shape protruding from a lower surface of a central part of the main plate portion 56.

The valve member 54 is an integrated molded product including a seal member 60 and a reinforcement member 62. The seal member 60 is made from a rubber-like elastic material such as rubber. The reinforcement member 62 is made from a metal material. The seal member 60 and the reinforcement member 62 are integrated with each other by insert molding.

The reinforcement member 62 includes a reinforcement plate portion 64, a projection portion 65 and an attachment axial portion 66. The reinforcement plate portion 64 is formed in an annular plate shape extending in a direction crossing the moving direction of the valve body 45, i.e., in a radial direction. The projection portion 65 is formed in a ring shape protruding from a lower surface of an outer periphery of the reinforcement plate portion 64. The projection portion 65 has an outer diameter that is equal to that of the reinforcement plate portion 64. The projection portion 65 is configured to face the valve seat portion 37 of the housing 22. The attachment axial portion 66 is formed in a hollow cylindrical shape extending from a lower surface of an inner periphery of the reinforcement portion 64. In this disclosure, the projection portion 65 side of the reinforcement member 62 (a lower side in FIG. 4) is referred to as "front side", whereas an opposite side (an upper side in FIG. 4) is referred to as "rear side".

The seal member 60 is shaped to cover an outer circumferential half of the reinforcement member 62. The seal member 60 includes a seal portion 68, an inner circumferential cover portion 69, a front cover portion 70, an outer circumferential cover portion 71 and a rear cover portion 72. The seal portion 68 is formed in an annular plate shape covering a lower surface of the projection portion 65 of the reinforcement member 62. The seal portion 68 is configured to be seated on the valve seat portion 37 of the housing 22.

The inner circumferential cover portion 69 continues from an inner periphery of the seal portion 68 and is formed in a cylindrical shape that covers an inner circumferential surface of the projection portion 65 of the reinforcement member 62. The front cover portion 70 continues to an upper end of the inner circumferential cover portion 69 and is formed in an annular plate shape covering a lower surface of the outer circumferential half of the reinforcement plate portion 64 of the reinforcement member 62. The outer circumferential cover portion 71 continues to an outer periphery of the seal portion 68 and is formed in a cylindrical shape covering an outer circumferential surface of the projection portion 65 of the reinforcement member 62. The rear cover portion 72 continues to an upper end of the outer circumferential cover portion 71 and is formed in an annular plate shape covering an upper surface of the outer circumferential half of the reinforcement plate portion 64 of the reinforcement member 62.

As shown in FIG. 3, the support member 52 is engaged with the valve member 54 by pressing the support axial portion 58 of the support member 52 into the attachment axial portion 66 of the reinforcement member 62 of the valve member 54. That is, the reinforcement member 62 is attached to the support member 52 without any additional separate member such as adhesive. The support member 52 and the reinforcement member 62 of the valve member 54 are engaged with each other at a central region thereof. The support member 52 is coaxially arranged with the reinforcement member 62 of the valve member 54. The outer circumferential cover portion 71 of the seal member 60 has an outer diameter that is substantially equal to that of the main plate portion 56 of the support member 52. The rear cover portion 72 of the seal member 60 is held between the main plate portion 56 of the support member 52 and the reinforcement plate portion 64 of the reinforcement member 62. In this disclosure, the outer circumferential cover portion 71 corresponds to "connection portion".

After the valve body 45 is disposed in the housing 22, the fitting portion 57 of the support member 52 is fitted into the lower end part of the spring 47 such that an outer circumferential part of the main plate portion 56 supports a lower end surface of the spring 47. That is, the support member 52 works as a spring receiving member.

In accordance with the above-described pressure control valve 20, because the valve member 54 is the integrally molded product including the seal member 60 and the reinforcement member 62, the production cost is lower as compared to a case wherein the reinforcement member 62 is attached to the seal member 60 with an adhesive. Furthermore, the support member 52 is engaged with the reinforcement member 62 by press fitting, so it is not necessary to provide any additional separate members such as adhesive for engaging the support member 52 with the seal member 60, thereby also lowering the production cost. Accordingly, the production costs can be lowered while reinforcing the seal member 60 with the reinforcement member 62 separate from the support member 52.

The reinforcement member 62 reinforces the seal member 60, so that engagement of the seal member 60 on the support member 52 can be improved as compared with a case that the seal member 60 is attached to the support member 52 without any reinforcement member.

The seal member 60 has the rear cover portion 72 continuing to the seal portion 68 and held between the support member 52 and the reinforcement member 62. Thus, the reinforcement member 62 is surrounded by the seal portion 68 and the rear cover portion 72 of the seal member 60, thereby improving an engagement between the seal member 60 and the reinforcement member 62. Because the rear cover portion 72 is held between the support member 52 and the reinforcement member 62, a positional displacement of the rear cover portion 72 caused by a long time of use can be prevented.

The reinforcement member 62 is formed in a plate shape extending in the direction perpendicular to the moving direction of the valve body 45, i.e., in the radial direction. And, the reinforcement member 62 has the projection portion 65 protruding toward the seal portion 68 of the seal member 60. Thus, the projection portion 65 of the reinforcement member 62 increases a surface pressure of the seal portion 68 of the seal member 60 on the valve seat portion 37 of the housing 22. Accordingly, a sealing property in a valve closed state can be improved.

In this embodiment, the support member 52 and the reinforcement member 62 are coaxially arranged and engaged with each other at the central region to provide the pressure control valve 20.

Figure 5:
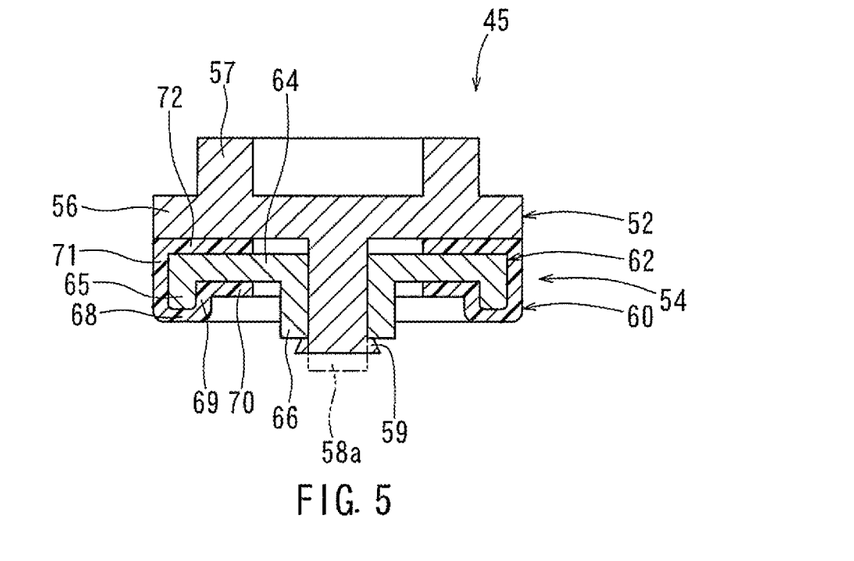
FIG. 5 is a cross-sectional view of the valve body according to a second embodiment.

Next, a second embodiment will be described in reference to FIG. 5. The second embodiment corresponds to the first embodiment having some changes, so such changes will be described and the same portions will not be described again. As shown in FIG. 5, an end (shown by a two-dot chain line 58a) of the support axial portion 58 of the support member 52 is plastically deformed so as to form an expanded portion 59 having an enlarged outer diameter. The expanded portion 59 can certainly hold the valve member 54 on the support member 52. In this embodiment, the support axial portion 58 of the support member 52 may not be pressed into the attachment axial portion 66 of the reinforcement member 62.

A third embodiment will be described in reference to FIGS. 6 and 7. The third embodiment corresponds to the first embodiment having some changes, so such changes will be described and the same portions will not be described again. In the third embodiment, the support member 52 has a support axial portion 76 instead of the support axial portion 58. The support axial portion 76 is formed in a hollow cylindrical shape extending from a lower surface of the outer periphery of the main plate portion 56 and is coaxially arranged with the main plate portion 56. The support axial portion 76 has an outer diameter that is equal to that of the main plate portion 56.

The reinforcement member 62 has a reinforcement plate portion 78 and an attachment axial portion 80 instead of the reinforcement plate portion 64 and the attachment axial portion 66 as depicted in FIG. 5. The reinforcement plate portion 78 is formed in an annular plate shape extending outward in the radial direction from an upper end of the projection portion 65. The reinforcement plate portion 78 has an inner diameter that is equal to that of the projection portion 65. The attachment axial portion 80 is formed in a hollow cylindrical shape extending from a lower surface of the outer periphery of the reinforcement plate portion 78. The attachment axial portion 80 has an outer diameter that is equal to that of the reinforcement plate portion 78.

The seal member 60 has an inner circumferential cover portion 82, an outer circumferential cover portion 83 and a rear cover portion 84 instead of the inner circumferential cover portion 69, the outer circumferential cover portion 71 and the rear cover portion 72 as depicted in FIG. 5. Furthermore, the front cover portion 70 is omitted. The inner circumferential cover portion 82 continues to the inner periphery of the seal portion 68 and is formed in a cylindrical shape covering the inner circumferential surface of the projection portion 65 of the reinforcement member 62. The outer circumferential cover portion 83 continues to the outer periphery of the seal portion 68 and is formed in a cylindrical shape covering the outer circumferential surface of the projection portion 65 of the reinforcement member 62. The rear cover portion 84 continues to an upper end of the inner circumferential cover portion 82 and is formed in an annular plate shape covering an upper surface of an inner circumferential half of the reinforcement plate portion 78 of the reinforcement member 62. In this disclosure, the inner circumferential cover portion 82 corresponds to the "connection portion".

Figure 6:
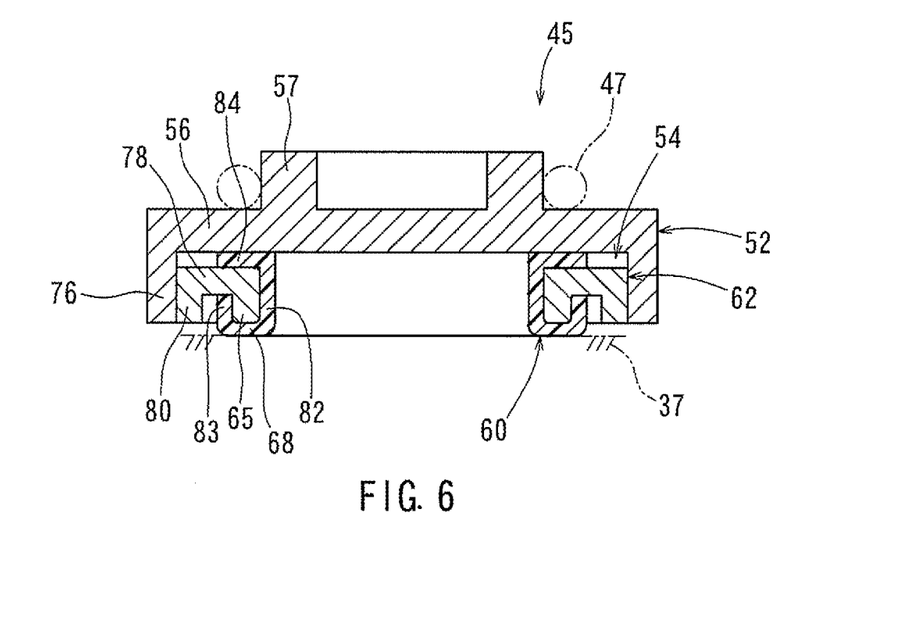
FIG. 6 is a cross-sectional view of the valve body according to a third embodiment.
Figure 7:
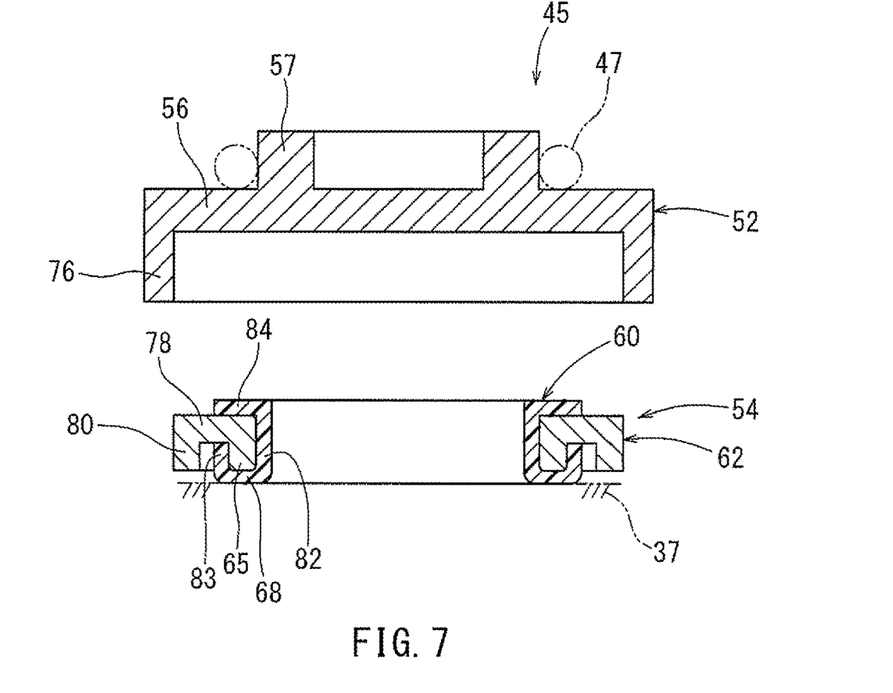
FIG. 7 is an exploded cross-sectional view of the valve body.

As shown in FIG. 6, the support member 52 and the valve member 54 are engaged with each other by pressing the attachment axial portion 80 of the reinforcement member 62 of the valve member 54 into the support axial portion 76 of the support member 52. That is, the reinforcement member 62 is attached to the support member 52 without any additional separate member. The support member 52 is engaged with the reinforcement member 62 of the valve member 54 at an outer circumferential region. The support member 52 is coaxially arranged with the reinforcement member 62 of the valve member 54. The rear cover portion 84 of the seal member 60 is held between the main plate portion 56 of the support member 52 and the reinforcement plate portion 78 of the reinforcement member 62. According to this embodiment, it is able to provide the pressure control valve 20 where the support member 52 is engaged with the reinforcement member 62 of the valve member 54 at the outer circumferential region.

Figure 8:
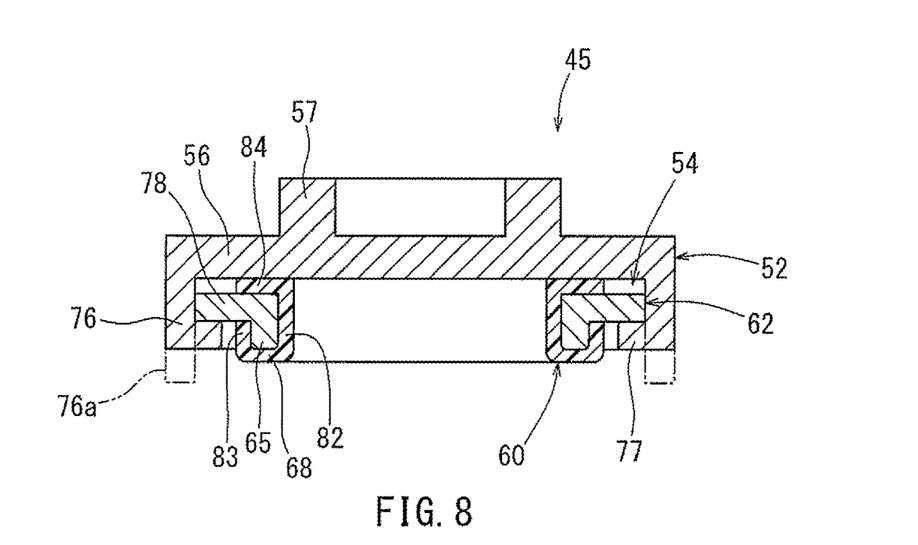
FIG. 8 is a cross-sectional view of the valve body according to a fourth embodiment.

A fourth embodiment shown in FIG. 8 corresponds to the third embodiment having some changes. Thus, such changes will be described, and the same portions will not be described again. The support axial portion 76 of the support member 52 has a bent portion 77. And, the attachment axial portion 80 of the reinforcement member 62 (FIG. 7) is omitted. The bent portion 77 is formed by plastically bending an end portion 76a (shown by the two-dot line in FIG. 8) of the support axial portion 76 of the support member 52 inward. The bent portion 77 can certainly hold the valve member 54 on the support member 52. In this embodiment, the reinforcement plate portion 78 of the reinforcement member 62 of the valve member 54 may not be pressed into the support axial portion 76 of the support member 52.

Figure 9:
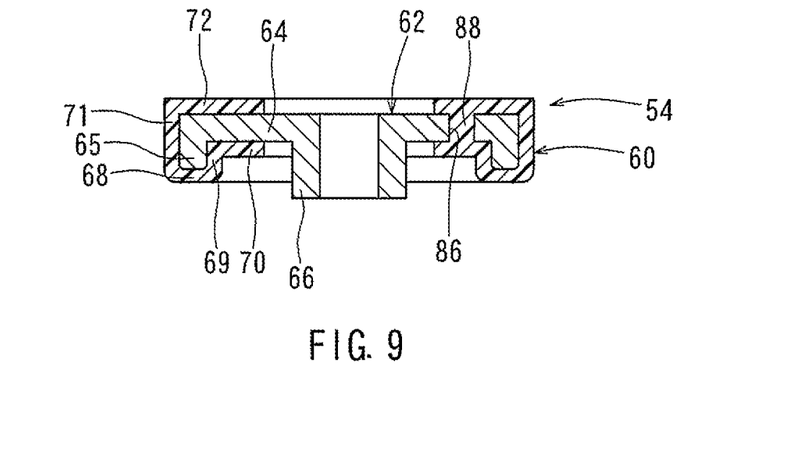
FIG. 9 is a cross-sectional view of a valve member according to a fifth embodiment.
Figure 10:
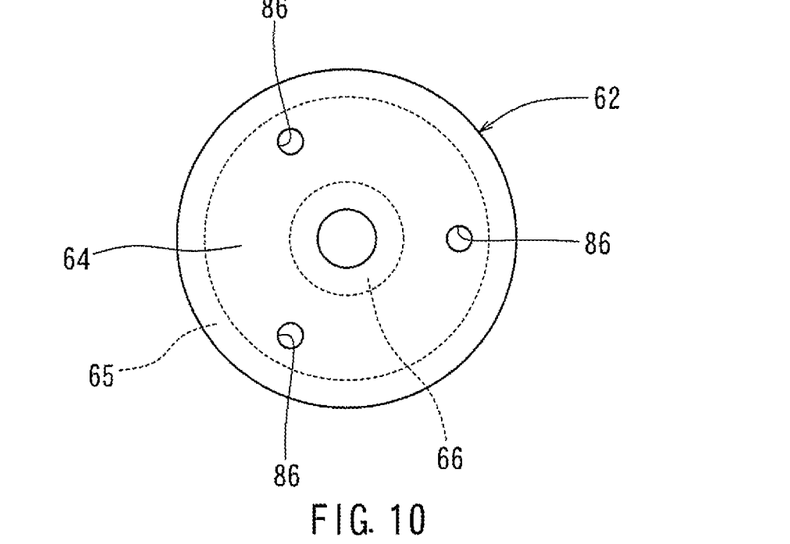
FIG. 10 is a top view of a reinforcement member.

A fifth embodiment shown in FIGS. 9 and 10 corresponds to the first embodiment having some changes. Thus, such changes will be described, and the same portions will not be described again. In the fifth embodiment, the reinforcement plate portion 64 of the reinforcement member 62 has three through-holes 86 arranged at regular intervals in a circumferential direction. The through-holes 86 are located between the seal portion 68 and the rear cover portion 72. Each of the through-holes 86 is formed in a circular shape.

According to this embodiment, the reinforcement member 62 has the through-holes 86 located between the seal portion 68 and the rear cover portion 72. Thus, when the seal member 60 and the reinforcement member 62 are integrally molded by insert molding, the through-holes 86 are filled with a rubber-like elastic material. The elastic material filled in the through-holes 86 forms connection portions 88 connecting the seal portion 68 to the rear cover portion 72. Accordingly, an engagement between the seal member 60 and the reinforcement member 62 can be improved.

This disclosure is not limited to the above-described embodiments and can be modified without departing from the scope of the invention. For example, the pressure control valve 20 can be used for various apparatuses for controlling fluid pressure other than the fuel supply system 10 for the engine. The pressure control valve 20 can be used as another type of valve, such as a relief valve or a check valve. The support member 52 and the reinforcement member 62 can be made from various materials having a higher strength than the seal member 60 other than metal materials. The seal member 60 only needs to include at least the seal portion 68. When the reinforcement plate portions 64 and 78 are configured to face the valve seat portion 37 of the housing 22, the projection portion 65 can also be omitted. The number, the shape and arrangement of the through-holes 86 of the reinforcement member 62 can be changed.

What is claimed is:

1. A pressure control valve comprising:
a housing including a valve seat and defining a fluid path therein;
a valve body including a support member and a valve member; and
a spring biasing the valve body toward the valve seat in a valve closing direction;
wherein the valve member includes a seal member and a reinforcement member that reinforces the seal member, wherein the seal member and the reinforcement member are integrated with each other;
wherein the seal member is an elastic member and includes a seal portion that is configured to be seated on the valve seat;
wherein the reinforcement member is engaged with the support member without using a separate member;
wherein the reinforcement member has a projection portion protruding toward the seal portion of the seal member; and
wherein the seal portion of the seal member is disposed between the projection onion of the reinforcement member and the valve seat along the valve closing direction.

2. The pressure control valve according to claim 1, wherein the reinforcement member comprises a plate shape extending in a direction across the valve closing direction, and wherein the projection portion extends from the plate portion.

3. The pressure control valve according to claim 1, wherein the support member and the reinforcement member are coaxially arranged.

4. The pressure control valve according to claim 1, wherein the support member is engaged with the reinforcement member at a central region of the support member.

5. The pressure control valve according to claim 1, wherein the spring includes a first end and a second end, wherein the first end is engaged with a wall of the housing and the second end is engaged with the support member.

6. The pressure control valve according to claim 1, wherein the seal member includes a rear cover portion positioned between the support member and the reinforcement member along the valve closing direction.

7. The pressure control valve according to claim 6, wherein the reinforcement member has a through-hole located between the seal portion and the rear cover portion, wherein the through-hole is offset from a central axis of the reinforcement member.

8. The pressure control valve according to claim 1, wherein the support member is engaged with a radially outermost circumferential surface of the reinforcement member.

9. The pressure control valve according to claim 6, wherein the seal member includes an outer circumferential cover portion that extends from the rear cover portion to the seal portion, and wherein the outer circumferential cover portion is disposed over an outer circumferential surface of the projection portion.

10. The pressure control valve according to claim 1, wherein the support member includes an axial portion that extends through a central hole in the reinforcement member.

11. The pressure control valve according to claim 10, wherein the central hole extends through a hollow cylindrical attachment axial portion of the reinforcement member.

* * * * *